United States Patent [19]

Klingler et al.

[11] Patent Number: 4,660,296
[45] Date of Patent: Apr. 28, 1987

[54] SENSING HEAD FOR A MEASURING MACHINE

[75] Inventors: Otto Klingler, Oberndorf-Boll; Kurt Linder, Karlsruhe, both of Fed. Rep. of Germany

[73] Assignee: Mauser-Werke Oberndorf GmbH, Fed. Rep. of Germany

[21] Appl. No.: 714,681

[22] Filed: Mar. 21, 1985

[30] Foreign Application Priority Data

Apr. 3, 1984 [DE] Fed. Rep. of Germany ....... 3412302

[51] Int. Cl.⁴ .............................................. G01B 7/28
[52] U.S. Cl. .................................. 33/559; 33/169 R
[58] Field of Search ................... 33/169 R, 556, 557, 33/558, 559, 560, 561, 172 E

[56] References Cited

U.S. PATENT DOCUMENTS

| 3,869,799 | 3/1975 | Never et al. | 33/560 |
| 4,130,941 | 12/1978 | Amsbury | 33/558 |
| 4,471,529 | 9/1984 | Kohler | 33/559 |
| 4,523,382 | 6/1985 | Werner et al. | 33/561 |
| 4,535,543 | 8/1985 | Linder | 33/559 |

FOREIGN PATENT DOCUMENTS 2242355 3/1974 Fed. Rep. of Germany .

Primary Examiner—Charles Frankfort
Assistant Examiner—Patrick R. Scanlon
Attorney, Agent, or Firm—McGlew and Tuttle

[57] ABSTRACT

A sensing head of a measuring machine comprises three straight line guiding systems for respective x, y and Z directions. For weight compensation of each single straight line guiding system, a first spring pair is arranged between a fixed beam element and a beam of the first straight line guiding system. This compensates the weight loading the first straight line guiding system. Between the beam of the first straight line guiding system and a beam of the second straight line guiding system, a second spring pair is arranged which compensates the weight loading the second straight line guiding system. Between the beam of the second straight line guiding system and a beam of the third straight line guiding system, a third spring pair is arranged which compensates the weight loading the third straight line guiding system.

3 Claims, 1 Drawing Figure

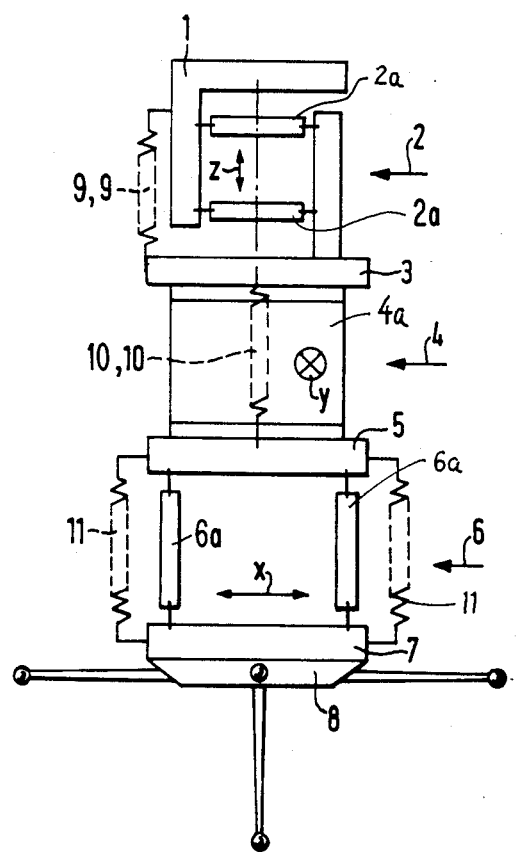

SENSING HEAD FOR A MEASURING MACHINE

FIELD AND BACKGROUND OF THE INVENTION

The present invention relates to a sensing head for a measuring machine with straight line guiding systems for the deflection of a measuring sensor in x, y, and z coordinate directions, the first straight line guiding system being attached to a beam member of the measuring machine and each straight line guiding system comprising a beam on which the respective next straight line guiding system is arranged. The measuring sensor is attached on the beam of the third straight line guiding system, and springs are provided for weight compensation.

Such a sensing head is described in U.S. Pat. No. 3,869,799 (German patent application No. 2,242,355). There a spiral spring whose tension is adjustable by means of a motor is arranged between a beam member and a measuring sensor. Thereby the weight which loads the straight line guiding system acting in the z-direction is to be compensated. What is favorable about this arrangement is that the spiral spring influences the characteristics of the straight line guiding systems acting in the x- and y-directions. In addition, this arrangement is costly due to the use of a motor drive.

SUMMARY OF THE INVENTION

It is an object of the present invention to provide a sensing head of the initially mentioned kind in which the weight compensation measures barely influence the characteristics of the straight line guiding systems.

According to the invention, the above problem is solved in a sensing head of the initially mentioned kind in that between the beam member and the beam of the first straight line guiding system a first spring system is arranged which at least partly compensates the weight that is loading the first straight line guiding system. Between the beam of the first straight line guiding system a second spring system is arranged which compensates, again at least partially, the weight loading the second straight line guiding system. Between the beam of the second straight line guiding system and the beam of the third straight line guiding system a third spring system is arranged which at least partly compensates the weight loading the third straight line guiding system.

By the third spring system the third straight line guiding system is relieved of the weight of its support plate and the weight of the measuring sensor. The characteristic of the third straight line guiding system is therefore hardly distorted by the masses of these parts. This has a favorable effect in particular on the deflection of the third straight line guiding system.

By the second spring system the second straight line guiding system is relieved of the weight of its own support plate, the weight of the third straight line guiding system, the third spring system, and the measuring sensor. The characteristic of the second straight line guiding system, too, is therefore hardly distorted by the masses of these parts. This has a favorable effect in the deflection of the second straight line guiding system.

By the first spring system the first straight line guiding system is relieved of the weight of its support plate and of the weight of the parts of the second and third straight line guiding systems suspended from it, including the second and third spring systems and the measuring sensor. Also the characteristic of the first straight line guiding system is therefore hardly distorted by the masses of these parts. This has a favorable effect in particular in the deflection of the first straight line guiding system.

In all, therefore, each straight line guiding system by itself is relieved of the respective weight suspended from it. Preferably the spring systems fully absorb the weights suspended from them and the force-deflection characteristics of the straight line guiding systems have the same shape.

Accordingly another object of the invention is to provide a sensing head for a measuring machine which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE in the drawing is a side elevational view of the sensing head showing its three suspended straight line guiding systems.

DESCRIPTION OF THE PREFERRED EMBODIMENT

Referring to the drawing in particular, the invention embodied therein comprises a sensing head for a measuring machine which utilizes three mutually stacked straight line guiding systems whose respective weight is suspended from springs so that deflections of the guiding systems in the x, y, and z coordinate directions remain substantially uneffected by the weight of the systems.

A beam member 1 is firmly connected with a spindle (not shown) of a measuring machine and forms a fixed frame of reference. Arranged on the beam member 1 as a first straight line guiding system is a spring parallelogram 2 acting in the z-direction. The spring parallelogram 2 comprises a beam 3. Arranged thereon is a spring parallelogram 4 acting in the y-direction, as a second straight line guiding system.

Opposite beam 3 the spring parallelogram 4 is provided with a beam 5 on which an additional spring parallelogram 6 is arranged as a third straight line guiding system. On a beam 7 thereof, opposite beam 5, a measuring sensor 8 is fastened.

The spring parallelograms 2, 4 and 6 operate with leaf springs respectively shown at 2a, 4a and 6a. All three spring parallelograms 2, 4 and 6 are constructed so as to have the same deflection force-deflection path characteristic.

A first spring pair 9,9 is arranged between beam member 1 and beam 3. Between beam 3 and beam 5 a second spring pair 10, 10 is arranged, one spring of which can be seen in the FIGURE. The other spring is behind the shown spring on an opposite side of the leaf springs 4a and is partly visible. A third spring pair 11, 11 acts between the beams 5 and 7.

The spring pair 11 is designed so that it transmits the weight of beam 7 and of the measuring sensor 8 to beam 5. The spring parallelogram 6 is thereby relieved of the weight of these parts, so that their mass hardly influences the characteristic of the spring parallelogram 6 in particular in case of a deflection.

The second spring pair 10 is rated so that it transmits the weight suspended from it of the beam 5, of the spring parallelogram 6, of the spring pair 11, of the beam 7 and of the measuring sensor 8 to beam 3, so that the spring parallelogram 4 is relieved of these masses. Thus also the characteristic of this spring parallelogram is largely independent of the weight of the parts suspended from it.

The spring pair 9 is dimensioned so that it transmits the weight of beam 3, of the spring parallelogram 4, of the spring pair 10, of beam 5, of the spring parallelogram 4, of the spring pair 10, of beam 5, of the spring parallelogram 6, of the spring pair 11, of beam 7 and of the measuring sensor 8 to the beam member 1. Thereby also the spring parallelogram 2 is relieved of the weights suspended from it, so that they hardly distort the characteristic thereof.

If additional structural members are disposed on beams 3, 5 or 7, then the spring pairs 9, 10, 11 are designed so that they compensate also their weight.

When the measuring sensor 8 is moved against an object to be measured in x-, y- or z-directions, substantially the same dynamic conditions will result in each of the three directions.

The springs of the spring pairs 10 and 11 are arranged on opposite sides of the respective spring parallelograms 4 and 6. Each spring of the spring pairs 10 and 11 is provided near and centered with one of the legs of the spring parallelograms 4 and 6. Another possibility, however, is to arrange the springs of the spring pairs 10 and 11 between the two legs of the respective spring parallelograms 4 and 6. Instead of the spring pair 10 or 11, one spring will then suffice.

While spring pairs are shown which are positioned substantially on opposite sides of the beams in each straight line guiding system, a single spring can be used in each instance as long as it is properly centered so as to avoid rotational moments. A rotational moment for the beam 3 of the first straight line guiding system 2 is avoided even though spring or spring pair 9 is to one side of the beam, since the beam 3 is already mounted for movement only in the z-direction.

The force-deflection characteristic curve for the spring or spring pairs 9, 10 and 11, are selected so that they each have the same shape.

While a specific embodiment of the invention has been shown and described in detail to illustrate the application of the principles of the invention, it will be understood that the invention may be embodied otherwise without departing from such principles.

What is claimed is:

1. A multi-coordinate sensing head for a measuring machine, comprising:

a machine beam defining a fixed frame of reference for movements in x, y and z coordinate directions;

first straight line guiding means having a first beam suspended from said machine beam and mounted to said machine beam for movement vertically in said z direction;

second straight line guiding means having a second beam suspended from said first beam and mounted to said first beam for movement horizontally in said y direction;

third straight line guiding means having a third beam suspended from said second beam and mounted to said second beam for movement horizontally in said x direction;

a first pair of spring means connected between said machine beam and said first beam on opposite sides thereof in said direction and having a force-deflection characteristic curve which is selected to compensate for all weight suspended from said first beam;

a second pair of springs connected between said first and second beams on opposite sides thereof in one of said x and y directions and having a spring characteristic which is selected to compensate for all weight suspended from said second beam a third pair of springs connected between said second and third beams on opposite sides thereof in one of said x and y directions and having a spring characteristic which is selected to compensate for all weight suspended from said third beam; and a sensing member connected to said third beam for contacting a workpiece to be measured.

2. A sensing head according to claim 1, wherein said characteristic curves of said first, second and third pairs of springs is selected to have the same shape.

3. A spring sensing head according to claim 1, wherein said first straight line guiding means comprises a first pair of leaf springs connected between said machine beam and said first beam, said second straight line guiding means comprising a second pair of leaf springs connected between said first beam and said second beam, said third straight line guiding means comprising a third pair of leaf springs connected between said second beam and said third beam, said leaf springs providing movement in said respective z, y and z directions.

* * * * *